US006409017B1

(12) United States Patent
Bookbinder et al.

(10) Patent No.: US 6,409,017 B1
(45) Date of Patent: Jun. 25, 2002

(54) USE OF INHIBITOR IN OPTICAL FIBER REEL COVERS

(75) Inventors: Dana C. Bookbinder, Corning; J. Richard Toler, Painted Post, both of NY (US)

(73) Assignee: Corning Incorporated, Corning, NY (US)

( * ) Notice: Subject to any disclaimer, the term of this patent is extended or adjusted under 35 U.S.C. 154(b) by 114 days.

(21) Appl. No.: 09/608,546

(22) Filed: Jun. 30, 2000

(51) Int. Cl.$^7$ ............................. B65D 85/04; F21V 9/06
(52) U.S. Cl. ...................... 206/398; 206/400; 206/407; 242/601; 252/589; 385/135
(58) Field of Search ..................... 385/135; 242/601; 206/398, 400, 401; 252/589

(56) References Cited

U.S. PATENT DOCUMENTS

| | | | |
|---|---|---|---|
| 3,644,394 A | 2/1972 | Gurney | |
| 3,888,821 A | 6/1975 | Milford, Jr. | 260/45.8 |
| 4,024,106 A | 5/1977 | Mader | 260/45.95 |
| 4,482,204 A * | 11/1984 | Blyler, Jr. et al. | 350/96.34 |
| 4,569,966 A | 2/1986 | Piccirilli et al. | 524/589 |
| 4,923,915 A | 5/1990 | Urruti | |
| 5,104,433 A | 4/1992 | Chapin et al. | 65/3.1 |
| 5,165,543 A | 11/1992 | Heyda et al. | 206/400 |
| 5,199,098 A | 3/1993 | Nolan et al. | |
| 5,205,059 A | 4/1993 | Doll | 40/152 |
| 5,236,982 A | 8/1993 | Cossement et al. | |
| 5,246,184 A | 9/1993 | Trewhella, Jr. | 242/117 |
| 5,300,399 A | 4/1994 | Wilczak | |
| 5,362,014 A * | 11/1994 | Sandham | 244/3.12 |
| 5,441,813 A | 8/1995 | Sano et al. | 428/375 |
| 5,446,821 A | 8/1995 | Nonaka et al. | |
| 5,539,013 A | 7/1996 | Eckberg et al. | |
| 5,562,985 A | 10/1996 | Sano et al. | 428/375 |
| 5,646,207 A | 7/1997 | Schell | |
| 5,648,488 A | 7/1997 | Stevenson | 544/215 |
| 5,707,871 A | 1/1998 | Wilczak | |
| 5,761,368 A * | 6/1998 | Arnett et al. | 385/134 |
| 5,824,413 A | 10/1998 | Schell | |
| 5,923,807 A * | 7/1999 | Wild | 385/135 |
| 5,971,316 A | 10/1999 | Kim | 242/601 |
| 5,986,018 A | 11/1999 | Yamaguchi et al. | 525/455 |
| 6,011,080 A | 1/2000 | Daly | 522/107 |
| 6,241,063 B1 * | 6/2001 | Van Ess et al. | 385/135 |
| 6,263,143 B1 * | 7/2001 | Potteiger et al. | 385/135 |

OTHER PUBLICATIONS

Lowilite 22, "Ultraviolet Light Absorber for Plastics and Coatings", Great Lakes Chemical Corportation, 2–Hydroxy–4–n–octoxybenzophenone, CAS No. 1843–05–06; Jul. 9, 1996.

"Ultraviolet Absorber", Hawley's Condensed Chemical Dictionary, copyright 1997, pp. 150, 821, 1152 and 1153.

Precise Color Communication; Minolta; 1994; pp. 18–19.

Plastics Additives Handbook, Stabilizers, Processing Aids, Plasticizers, Fillers, Reinforcements, Colorants for Thermoplastics, R. Gather and H. Muller, P.O. Klemchuk, copyright 1990; pp. 129–270.

"Photostabilization of Polypropylene. II. Stabilizers and Hydroperoxides" D.J. Carlsson and D.M. Wiles; Journal of Polymer Science: Polymer Chemistry Edition; vol. 12, pp. 2217–2233 (1974).

"Photo–oxidation of Polypropylene Films. VI. Possible UV–stabilization Mechanisms" D.J. Carlsson, T. Suprunchuk and D.M. Wiles; Journal of Applied Polymer Science; vol. 16, pp. 615–626 (1972).

"A Breakthrough in Yellowing Inhibition of Mechanical Pulp"; TAPPI Proceedings—1999 International Mechanical Pulping Conference; P. McGarry, et al; 1999; pp. 183–192.

"Chromatographic Determination of UV Absorbers in Car Paints" J. Liq. Chrom. & Ref. Technol.; M.C. Gennaro, et al; 1999; pp. 2689–2700.

"Next Generation UV Absorbers for Plastics"; AddCon '95: Worldwide Additives & Polymer Modifiers Conference; Paper No. 6; R.D. Cody, et al; Apr. 5–6, 1995; pp. 1–5.

"Milestones in Auto Emissions Control"; EPA Fact Sheet OMS–12; Aug. 1994.

"Additives for Trade Sales and Industrial Coatings", Formulators Guide, Ciba, pp. 37 and 40.

"Color Systems", Chroma Meter CR–300/CR–310/CR–331, Minolta, pp. 77–80.

Patent Abstracts of Japan vol. 2000, No. 24, May 11, 2001 & JP 2001 183533 A (Sumitomo Electric Ind Ltd), Jul. 6, 2001.

* cited by examiner

Primary Examiner—Robert Dawson
Assistant Examiner—Jeffrey B. Robertson
(74) Attorney, Agent, or Firm—Timothy R. Krogh

(57) ABSTRACT

The disclosed invention includes a composition for an optical fiber reel cover. The cured composition includes a polymer and a light inhibitor. The invention also includes a method of making an optical fiber reel cover with the inventive composition. The invention further includes a method to prevent photo-yellowing of coated optical fiber stored on a spool. The inventive reel cover is attached to a spool containing the fiber stored on a barrel of the spool. The cover conceals the fiber.

23 Claims, 3 Drawing Sheets

USE OF INHIBITOR IN OPTICAL FIBER REEL COVERS

BACKGROUND OF THE INVENTION

1. Field of the Invention

The present invention relates generally to optical fibers (hereinafter fiber), and particularly to reel covers for the fiber.

2. Technical Background

Fiber has acquired an increasingly important role in the field of telecommunications, frequently replacing existing copper wires. This trend has had a significant impact in all areas of telecommunications, which has seen a vast increase in the usage of fiber. Further increases in the use of fiber is at least foreseen in local loop telephone and cable TV service, as local fiber networks are established to deliver ever greater volumes of information in the form of data, audio, and video signals to residential and commercial users. In addition, use of fiber in home and commercial business environments for internal data, voice, and video communications has begun and is expected to increase.

Optical fibers typically contain a glass core and at least two coatings, e.g., a primary (or inner) coating and a secondary (or outer) coating. The primary coating is applied directly to the glass fiber and, when cured, forms a soft, elastic, and compliant material which encapsulates the glass fiber. The primary coating serves as a buffer to cushion and protect the glass fiber core when the fiber is bent, cabled, or spooled. The secondary coating is applied over the primary coating and functions as a tough, protective outer layer that prevents damage to the glass fiber during processing and use.

Exposure of the fiber to light has caused the appearance of the fiber to change from white or a translucent color to a yellow color. This phenomenon is known as photo-yellowing of the fiber. It has been determined that photo-yellowing is mainly caused by exposure of light to the primary coating and to a lesser degree by exposure of light to the secondary coating.

Photo-yellowing can cause problems with fiber identification, particularly in dimly lit places such as a manhole. Fiber covered with a lighter colored ink, such as light blues (aqua), yellows, or greens, tend to appear as a brown color as the fiber undergoes photo-yellowing.

Previous unsuccessful attempts to solve this problem have included adding an UV light inhibitor to a coating. However, this attempt has complicated the coating of fiber because fiber coatings are typically cured by UV light. Therefore, the UV inhibitor can interfere with the curing of the coating. The need for a method to prevent the photo-yellowing of the fiber still exists.

SUMMARY OF THE INVENTION

One aspect of the present invention is a composition for an optical fiber reel cover. The cover composition includes a polymer and an UV light inhibitor. The cover exhibits a transmission of less than about 50% of light wavelengths shorter than about 420 nm and allowing transmission of more than about 55% of light wavelengths in the range of about 450 to about 700 nm.

The present invention has the advantage of preventing photo-yellowing of the fiber stored on a spool which is covered with a reel cover made in accordance with the invention. The inventive reel covers also have improved impact resistance. The present invention also improves the ability of a technician to identify the fiber that has been stored in accordance with the invention.

Additional features and advantages of the invention will be set forth in the detailed description which follows, and in part will be readily apparent to those skilled in the art from that description or recognized by practicing the invention as described herein, including the detailed description which follows, the claims, as well as the appended drawings.

It is to be understood that both the foregoing general description and the following detailed description are merely exemplary of the invention, and are intended to provide an overview or framework for understanding the nature and character of the invention as it is claimed. The accompanying drawings are included to provide a further understanding of the invention, and are incorporated in and constitute a part of this specification. The drawings illustrate various embodiments of the invention, and together with the description serve to explain the principles and operation of the invention.

DETAILED DESCRIPTION OF THE INVENTION

Figure 1:
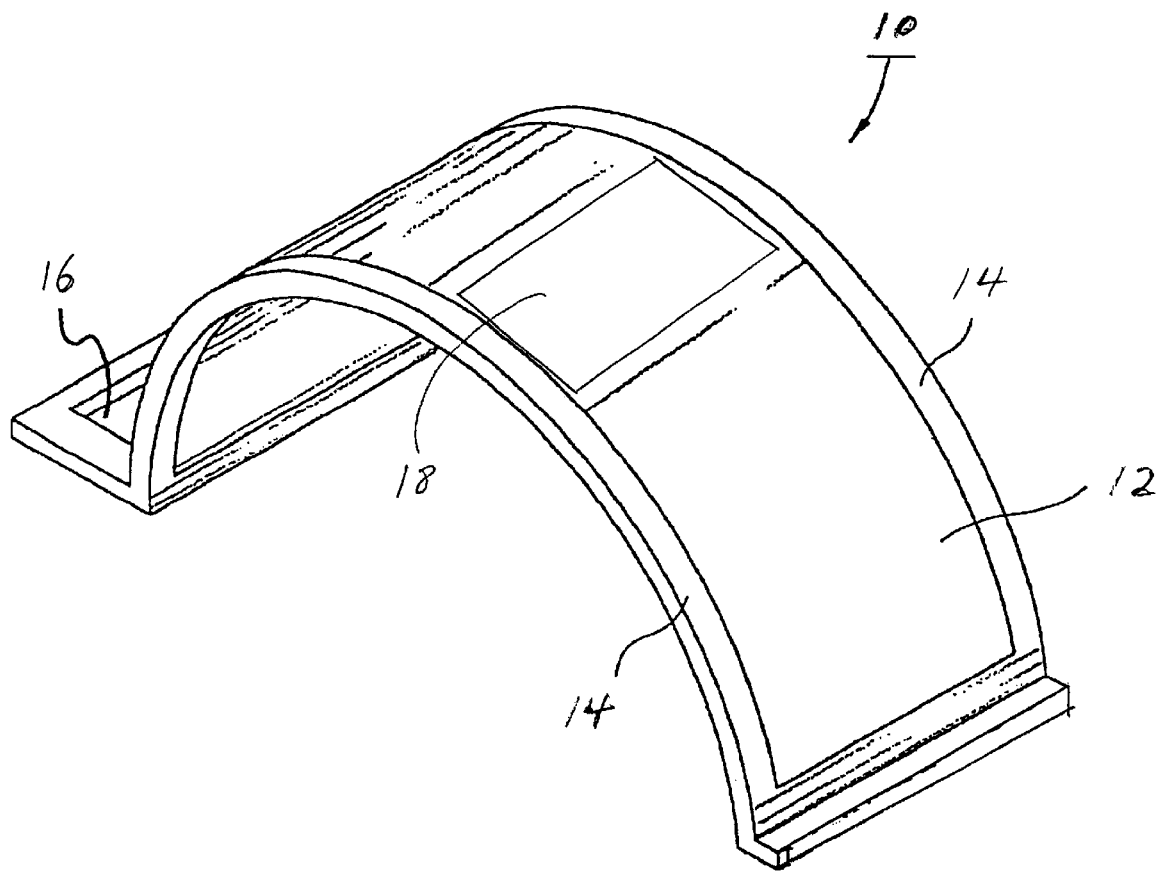
FIG. 1 is a perspective view of a portion of an optical fiber reel cover made in accordance with the invention.

Reference will now be made in detail to the present preferred embodiments of the invention, an example of which is illustrated in the accompanying drawings. Wherever possible, the same reference numbers will be used throughout the drawings to refer to the same or like parts. An exemplary embodiment of the optical fiber reel cover of the present invention is shown in FIG. 1, and is designated generally throughout by reference numeral 10.

In accordance with the invention, one embodiment includes cover 10 having two mating semicircular cover portions 12. (Only one of which is shown in FIG. 1.) Each portion 12 has a pair of spool guides 14. Spool guides 14 are designed and disposed to mate with the flanges 22 of spool 20 (shown in FIG. 2). The preferred thickness of portion 12 ranges from about 0.001" to about 1", more preferred about 0.005" to about 0.5", and most preferred about 0.06" to about 0.1". Cover 10 also has a handle 16 for transporting an assembly of cover 10 and spool 20. Cover 10 may also have at least one hinge (not shown) to couple portions 12 together. The hinge may be integral or separate from portions 12. Typically, the hinge is located at an opposite end of the portion 12 than handle 16 is located. Cover 10 may also have a locking mechanism to secure portions 12 together.

The composition of cover 10 includes a polymer and at least one light inhibitor. It is preferred that the polymer is a clear polymer. Cover 10, composed of a clear polymer, exhibits a transmission of at least about 55% of light in the wavelengths of about 450 to about 700 nm. It is preferred that cover 10 is no more than about 0.5" thick. It is more preferred that cover 10 exhibits a transmission of at least about 70% of the light in the aforementioned range of wavelengths. It is most preferred that cover 10 exhibits a transmission of at least about 80% of the light in the aforementioned range of wavelengths.

It is preferred that the inhibitor is an UV light inhibitor. An UV light inhibitor is defined herein as a material that will reduce the transmission of light with a wavelength shorter than about 420 nm, preferably about 420 nm to at least about 350 nm. It is preferred that when the inhibitor is included in the composition of cover 10, cover 10 exhibits a transmission of less than about 50% of the light having a wavelength shorter than about 420 nm . It is more preferred that the cover exhibits a transmission of less than about 35% of light in the range of wavelengths shorter than about 420 nm. It is most preferred that cover 10 exhibits a transmission of less than about 10% of light in the range of wavelengths shorter than 420 nm.

Figure 2:
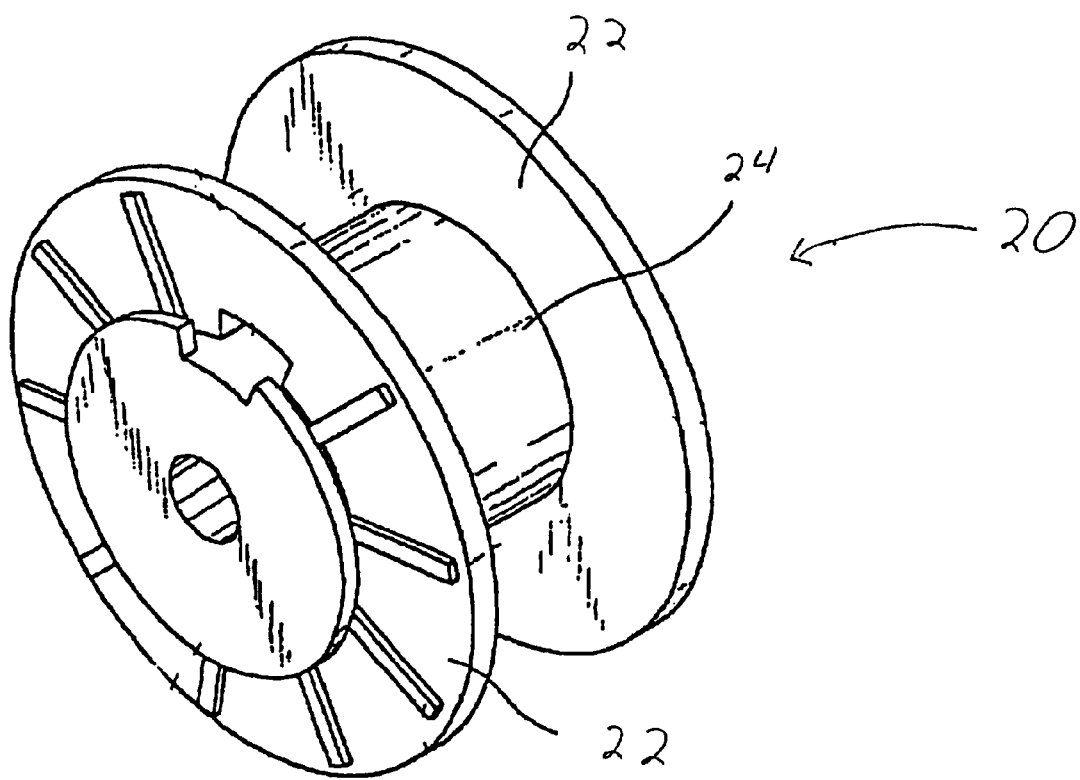
FIG. 2 is a perspective view of an optical fiber spool.

Suitable inhibitors may be any chemical that will prohibit the transmittance of a sufficient amount of UV light to prevent the photo-yellowing of fiber wound on spool 20 (Shown in FIG. 2). It has been discovered that photo-yellowing is caused by exposure of the coated fiber to light wavelengths shorter than about 420 nm, especially exposure to light wavelengths of 411 nm or shorter. Exposure to light wavelengths in the range of about 411 to about 402 nm has demonstrated a propensity to yellow the fiber. It is preferred that the inhibitor prevents the transmission of a sufficient amount of UV light to cause photo-yellowing to reach the fiber. It is more preferred that the inhibitor absorbs light of the aforementioned wavelengths and otherwise prevents a sufficient amount of the light, to photo-yellow the fiber, to reach the fiber stored on spool 20. It is most preferred that the inhibitor is a compound which absorbs the UV light and converts the UV light into heat.

Preferred inhibitors include triazoles, benzophenone, propanedioates, substituted sebacates, and substituted benzotriazoles. More preferred inhibitors include benzotriazoles such as 2-(2'-hydroxy-5'methylphenyl)-benzotriazole (commercially available as Tinuvin® P from Ciba, Tarrytown, N.Y.), 2-(3'-5'-di-tert-butyl-2'-hyroxyphenyl)-5-chlorobenzotriazole (commercially available as Tinuvin® 327 from Ciba), benzenepropanoic acid, such as 3-(2H-benzotriazol-2-yl)-5-(1, 1-dimethyl)-4-hydroxy-, C7–9 branched alkyl esters (commercially available as Tinuvin® 384 from Ciba), 2-(3', 5'-bis(1-methyl-1-phenylethyl)-2'-hydroxyphenyl)benzotriazole (commercially available as Tinuvin® 900 from Ciba), 2-[2-hydroxy-3-dimethylbenzylphenyl-5-(1,1,3,3-tetramethylbutyl)]-2H-benzotriazole (commercially available as Tinuvin® 928), poly (oxy-1,2-ethanediyl), α-[3-[3-(2H-benzotriazol-2-yl)-5-(1,1-dimethylethyl)-4-hydroxyphenyl]-1-oxopropyl]ω-hydroxy or poly(oxy-1,2-ethanediyl), α-[3-[3-(2H-benzotriazol-2-yl)-5-(1, 1-dimethylethyl)-4-hydroxyphenyl]-1-oxopropyl]-ω-[3-[3-(2H-benzotriazol-2-yl)-5-(1,1-dimethylethyl)-4-hydroxyphenyl]-1-oxopropyl]- (commercially available as Tinuvin® 1130 from Ciba), and 2-[4-[2-hydroxy-3-tridecyl oxypropyl]oxy]-2-hydroxyphenyl ]-4,6-bis(2,4-dimethylphenyl)-1,3,5-triazine and 2-[4-[2-hydroxy-3-dodecyl oxypropyl] oxy]-2-hydroxyphenyl]-4,6-bis(2,4-dimethylphenyl)-1,3,5-triazine (commercially available as Tinuvin® 400 from Ciba). A most preferred benzotriazole includes 2(2'-hydroxy-3-5'-di-tert-amylphenyl)benzotriazole (Commercially available as Tinuvin® 328 from Ciba). An example of a preferred substituted benzotriazole is decanedioic acid, bis(2, 2,6,6-tetramethyl-4-piperidinyl) ester (Commercially available as Tinuvin® 123).

An example of a preferred benzophenone is 2-hydroxy-4-n-octoxybenzophenone (commercially available as Lowilite® 22 from Great Lakes Chemical Corp. of West Lafayette, Ind.). An example of a preferred propanedioate is bis(1,2,2,6,6-pentamethyl-4-piperidinyl) (3,5-di-tert-butyl-4-hydroxybenzyl)butylpropanedioate (commercially available as Tinuvin® 144 from Ciba). Preferred substituted sebacates include bis(2,2,6,6-tetramethyl-4-piperidyl) sebacate (commercially available as Tinuvin® 770 from Ciba) and bis(1,2,2,6,6-pentamethyl-4-piperidinyl) sebacate and methyl 1,2,2,6,6-pentamethyl-4-peperidinyl sebacate (commercially available as Tinuvin(® 292 from Ciba).

In one embodiment of the invention, the composition of the cover 10 includes up to about 15.0 weight percent of the inhibitor. It is preferred that the composition includes up to about 1.0 weight percent of the inhibitor. It is more preferred that the composition includes up to about 0.5 weight percent of the inhibitor. It is most preferred that the composition includes up to about 0.25 weight percent of the inhibitor.

Examples of suitable polymers for the manufacturing of cover 10 include polyolefins, polyvinyl-chloride, polycarbonate, polyethylene terephthalate, and butadiene-styrene. Preferred polyolefins include polyethylene, polypropylene, and polybutylene. Preferably the polyolefin is a homopolymer or co-polymer, however, the invention is not limited to only homopolymers or co-polymers. It is more preferred that the polyolefin is a random co-polymer. It is most preferred that the pplyolefin is a clarified random co-polymer, e.g. clarified random co-polymer polypropylene (commercially available as 549 Polypropylene from Montell, Wilmington, Del.).

Cover 10 has demonstrated excellent properties in preventing the transmittance of UV light to fiber would around a spool. An average change (delta (Δ) E) in color to a coated fiber disposed under cover 10 comprises a ΔE of less than 4 after more than 120 days of exposure to fluorescent light. It is preferred that the ΔE is less than 3. It is more preferred that the ΔE is less than 2.

In one embodiment, cover 10 is translucent meaning that visible light may pass through cover 10, however, the fiber concealed on spool 20 is not distinguishable from an exterior of cover 10. A person skilled in the art may refer to cover 10 as being frosted. Portion 12 may further include a clear window from which the fiber on spool 20 is distinguishable from an exterior of cover 10.

Inventive cover 10 has also exhibited excellent impact strength properties. Preferably, reel cover 10 has an impact strength of more than about 1.0 ft-lb/in. More preferably, cover 10 has an impact strength of more than about 2.0 ft-lb/in. Most preferably, cover 10 has an impact strength of more than about 3.0. ft-lb/in. The impact strength of cover 10 was measured with a Notched Izod Impact Test in accordance with ASTM D-256.

The invention also includes a method of making an optical fiber reel cover. The method includes molding the aforementioned composition into cover 10. One method of making cover 10 includes injection molding. A melt blend is formed of 85% polymer by weight and 15% inhibitor by weight to produce a concentrate. The concentrate is pelletizied. The concentrate pellets and untreated polymer (polymer without the inhibitor) are feed into an extruder at a preselected let down ratio. The let down ratio is the ratio of concentrate pellets to untreated polymer. The ratio may be based on mass, volume, weight, etc. Typically the amount of concentrate introduced into the extruder is controlled to determine the level of inhibitor found in the molded cover.

The invention further includes a method to prevent photo-yellowing of coated optical fiber stored on a spool. Cover 10 is attached to spool 20. Spool 20 includes two flanges 22 facing each other and separated by a cylindrical barrel 24. The fiber stored on spool 20 is wound around barrel 24. Cover 10 conceals the fiber and prevents the transmission of a sufficient amount of UV light to the fiber to cause photo-yellowing.

EXAMPLES

The invention will be further clarified by the following examples which are intended to be exemplary of the invention.

The inhibitor used in the reel covers was Tinuvin® 328. Tinuvin® 328 is a type of inhibitor known as a triazole—specifically its chemical name is 2(2'-Hydroxy-3',5'-di-tert-amylphenyl)benzotriazole. It functions by absorbing UV light which promotes a rearrangement of the atoms in the molecule. The rearranged molecule can then revert to the original molecule through the loss of heat. This material was compounded into the polypropylene (Montell Pro-Fax 549M) at a level of 85% polypropylene and 15% inhibitor. The molding operation used this compound along with standard polypropylene (549M) to mold the covers with three levels of inhibitor—0.25%, 0.50%, and 1.00%.

Photo-yellowing of Fiber Under Reel Covers

The photo-yellowing test was carried out on reel covers having 0.25%, 0.50%, and 1.00% by weight inhibitor and two control reel covers that did not include any inhibitor. Reels containing single mode fiber, such as SMF-28 available from Corning Incorporated, Corning, N.Y., were stored in each of the tested reel covers. The fiber was coated with an UV curable acrylate dual coating system available from DSM, Elgin, Ill.

Fibers under the reel covers were exposed to fluorescent lights with 32-watt cool white bulbs. The fibers were exposed to the light under ambient conditions. The lights were approximately 15 feet above the fibers being exposed. The fibers were left undisturbed during the exposure except for periodically being checked for color change using a Minolta CR-300 measuring unit. The CR-300 was calibrated to a white ceramic plate before each series of measurements. The fiber was only measured for color change beneath the "clear" window of the reel cover so that the same area of fiber was measured each time. Color measurements were taken in the L*a*b* color description system, which uses three values to determine the color change. L* is a lightness variable used to monitor the change in lightness to darkness or vice versa. The values a* and b* are the chromaticity coordinates. The a* is used to designate the change in red to green or vice versa. The b* indicates a change in the region from yellow to blue. This color description system is more fully described in the operating manual for the Minolta CR-300 measuring unit, which is incorporated herein by reference in its entirety. The total color change was calculated from the initial (time zero) values using the expression $$\Delta E = \sqrt{(\Delta L^{*2} + \Delta a^{*2} + \Delta b^{*2})}$$

As seen before for many different fiber coating systems, the majority of the change on exposure is in the b* term, which describes the yellow-blue portion of the color, indicating that this is a yellowing phenomenon.

To evaluate the ability of the inventive reel covers to slow photo-yellowing, a length of fiber measuring 4,125 feet long was sectioned and placed under the test-reel covers as shown below:

| Sample | Fiber Segment (Start to finish, feet) | Length, feet | % Inhibitor in Reel Cover |
|---|---|---|---|
| 1 | 0–375 | 375 | 0.25 |
| 2 | 375–750 | 375 | 0.25 |
| 3 | 750–1125 | 375 | 0.25 |
| 4 | 1125–1500 | 375 | 0.00 |
| 5 | 1500–1875 | 375 | 0.50 |
| 6 | 1875–2250 | 375 | 0.50 |
| 7 | 2250–2625 | 375 | 0.50 |
| 8 | 2625–3000 | 375 | 0.00 |
| 9 | 3000–3375 | 375 | 1.00 |
| 10 | 3375–3750 | 375 | 1.00 |
| 11 | 3750–4125 | 375 | 1.00 |

Therefore, the fiber was not a variable among the various reel covers tested. Before winding the fiber on the spool, a white paper was wrapped around the barrel of the spool. A length of fiber 375 feet long was wrapped around the barrel of each spool. The configuration of the fiber wrapped around the barrel of spool was approximately 1 inch wide and about 7 layers thick.

Figure 3:
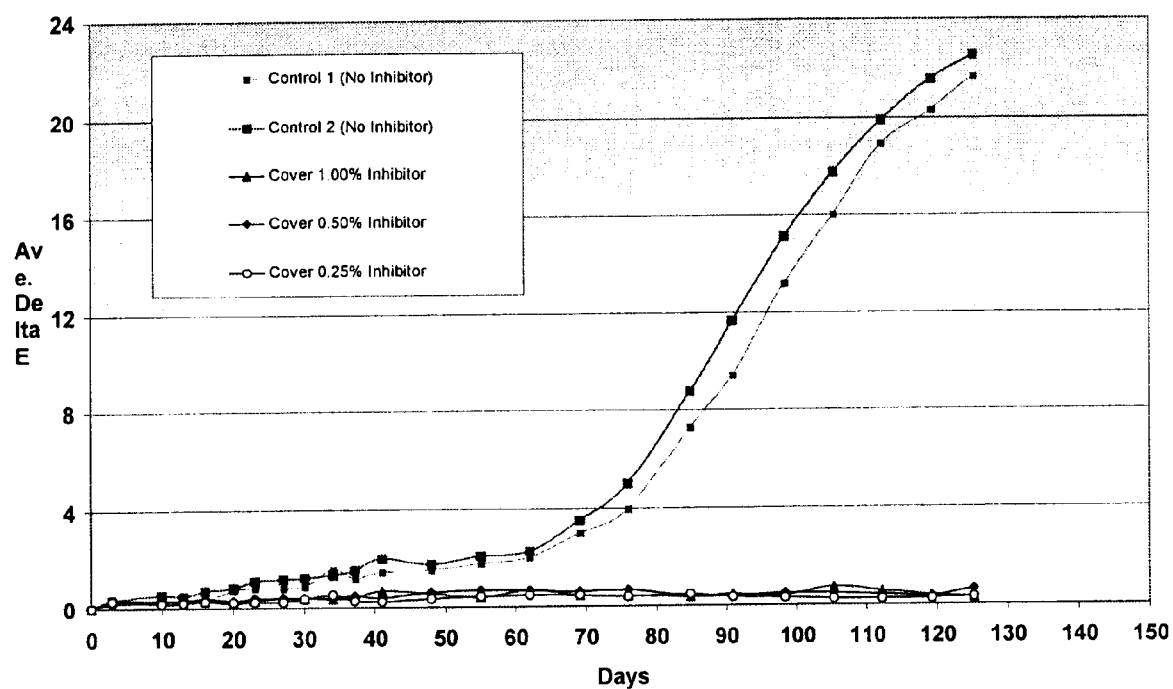
FIG. 3 is a chart of the photo-yellowing of a reel cover made in accordance with the invention.

The results up through 150 days of exposure are shown in FIG. 3. In the figure, the results of the three samples at each inhibitor level are averaged into a single line for clarity. In FIG. 3, as the ΔE increases the intensity of the yellowness of the fiber increases. It is preferred that the ΔE after 150 days of exposure to the light is less than about 8, preferably less than about 4, more preferably less than about 2. It was observed that the effects of photo-yellowing peaked in the exposure time frame of about 120 to about 160 days. Once this had occurred the fiber did not undergo any further significant photo-yellowing upon further exposure to light.

The Photo-yellowing Testing showed that as little as 0.25% of inhibitor in the reel over stops photo-yellowing up to at least 150 days, during which period fibers under control reel covers with no inhibitor turn quite yellow.

It will be apparent to those skilled in the art that various modifications and veriations can be made to the present invention without departing from the spirit and scope of the invention. Thus, it is intended that the present invention cover the modifications and variations of this invention provided they come within the scope of the apended claims and their equivalents.

What is claimed is:

1. An optical fiber reel cover comprising a polymer and a UV light inhibitor, wherein the cover exhibits a transmission of less than about 50% of light wavelengths shorter than about 420 nm and a transmission of more than about 55% of light wavelengths in the range of about 450 to about 700 nm.

2. The cover according to claim 1 wherein the transmission of wavelengths shorter than about 420 nm comprises less than about 35%.

3. The cover according to claim 1 wherein the inhibitor comprises a triazole.

4. The cover according to claim 3 wherein the triazole comprises a benzotriazole.

5. The cover of claim 4 wherein the benzotriazole comprises 2(2'-hydroxy-3-5'-di-tert-amylphenyl)benzotriazole.

6. The cover according to claim 1 wherein the polymer comprises at least one polyolefin.

7. The cover according to claim 1 wherein the cover comprises up to about 1.0 weight percent of the inhibitor.

8. The cover according to claim 7 wherein the cover comprises up to about 0.25 weight percent of the inhibitor.

9. The cover according to claim 1 wherein the inhibitor comprises a compound which absorbs UV light and converts the UV light into heat.

10. The cover according to claim 1 wherein the inhibitor comprises benzophenone.

11. The cover of according to claim 10 wherein the benzophenone comprises 2-hydroxy-4-n-octoxybenzophenone.

12. The cover according to claim 1 wherein the inhibitor comprises a sebacate.

13. The cover according to claim 1 wherein the inhibitor comprises a propanedioate.

14. The cover according to claim 6 wherein the polyolefin comprises polypropylene.

15. The cover according to claim 1 wherein the said wavelengths shorter than 420 nm comprises wavelengths of about 350 nm to about 420 nm.

16. The cover according to claim 1 wherein the inhibitor absorbs light having a wavelength of about 411 nm or shorter.

17. The cover according to claim 16 wherein the wavelength comprises about 411 to about 402 nm.

18. The cover according to claim 1 wherein the cover is capable of allowing transmission of less than about 30% of light wavelengths of about 411 nm or shorter.

19. The cover according to claim 1 wherein an impact strength of the cover comprises more than about 1.0 ft-lb/in.

20. The cover according to claim 19 wherein the impact strength comprises more than about 3.0 ft-lb/in.

21. The cover according to claim 1 having a thickness of no more than about 0.5".

22. The reel cover according to claim 1 wherein an average change in color to a coated fiber disposed under the cover comprises a delta E value of less than 4 after more than 120 days of exposure to fluorescent light.

23. The reel cover of claim 22 wherein the delta E comprises less than 2.

* * * * *

UNITED STATES PATENT AND TRADEMARK OFFICE
CERTIFICATE OF CORRECTION

PATENT NO.    : 6,409,017 B1
DATED         : June 25, 2002
INVENTOR(S)   : Dana C. Bookbinder and J. R. Toler It is certified that error appears in the above-identified patent and that said Letters Patent is hereby corrected as shown below:

<u>Title page,</u>
Item [56], References Cited, U.S. PATENT DOCUMENTS, "5,707,871 A 1/1998 Wilczak" should read -- 5,707,781 1/1998 Wilczak --.

Signed and Sealed this

Thirty-first Day of December, 2002

JAMES E. ROGAN
*Director of the United States Patent and Trademark Office*